United States Patent [19]

Shukla et al.

[11] Patent Number: 4,569,328

[45] Date of Patent: Feb. 11, 1986

[54] EFFICIENT, LOW EMISSIONS GAS RANGE COOKTOP

[75] Inventors: Kailash C. Shukla, Stow; James R. Hurley, Weymouth, both of Mass.

[73] Assignee: Gas Research Institute, Chicago, Ill.

[21] Appl. No.: 606,058

[22] Filed: May 2, 1984

[51] Int. Cl.[4] .................. F24C 3/00; F23D 13/12
[52] U.S. Cl. ................... 126/39 J; 126/39 K; 126/39 R; 431/328
[58] Field of Search .............. 431/350, 326, 328, 347; 126/39 R, 39 J, 39 F, 39 E, 39 H, 39 K, 39 D

[56] References Cited

U.S. PATENT DOCUMENTS

| | | | |
|---|---|---|---|
| 993,241 | 5/1911 | Glover | |
| 1,238,632 | 8/1917 | Caister | |
| 1,388,356 | 8/1921 | Mathy | |
| 2,575,514 | 7/1946 | Furczyk | 158/99 |
| 2,771,132 | 11/1956 | DuFault | 158/113 |
| 2,870,829 | 1/1959 | Williams | 158/113 |
| 2,921,176 | 1/1960 | Scofield | 219/37 |
| 3,084,736 | 4/1963 | Mentel et al. | 158/114 |
| 3,114,410 | 12/1963 | Schneider | 158/99 |
| 3,299,938 | 1/1967 | Bally et al. | 158/7.5 |
| 3,695,818 | 10/1972 | Misutani | 431/328 |
| 4,020,821 | 5/1977 | Reid, Jr. et al. | 126/39 E |

FOREIGN PATENT DOCUMENTS

| | | | |
|---|---|---|---|
| 1580535 | 9/1969 | France | 126/39 J |
| 1132295 | 10/1968 | United Kingdom | 126/39 J |

OTHER PUBLICATIONS

Rieck, Fred, "Gas Cooker Without Flames", from a brochure of German Company, (Schott), publication date believed to be Jan. 1981.

Hurley, James R. et al., U.S. Appln. Ser. No. 463,782, filed Feb. 4, 1983, "Radiant/Jet Impingement Gas-Fired Cooking Kettle".

Shukla, K. C. et al., "Development of an Efficient Low $NO_x$ Domestic Gas Range Cooktop", Annual Technical Report, Nov. 14, 1983.

Raloff, Janet, "Cleaner Cooking with Gas", Science News, vol. 125, No. 2, Jan. 14, 1984, pp. 28-29, 31.

Primary Examiner—William E. Lyddane
Assistant Examiner—Gerald Anderson
Attorney, Agent, or Firm—Herbert E. Messenger

[57] ABSTRACT

Disclosed is a gas-fired cooktop for a range which provides high thermal efficiency and low emissions of air pollutants, particularly low levels of $NO_x$. The cooktop includes a perforated tile burner which radiates infrared energy upward at a high flux rate to rapidly quench burner gas temperatures and inhibit the formation of $NO_x$. A perforated glass-ceramic jet plate positioned between the burner and a cooking vessel transmits most of the radiant infrared energy from the burner to the vessel and also forms jets of combustion products which are directed against the bottom of the vessel for convective heating. Thermal efficiencies of up to about 70 percent and $NO_x$ emissions as low as about 15 parts per million are achieved by the cooktop.

12 Claims, 6 Drawing Figures

EFFICIENT, LOW EMISSIONS GAS RANGE COOKTOP

BACKGROUND OF THE INVENTION

This invention relates to gas-fired cooking ranges and particularly to a cooktop for domestic gas ranges which provides high thermal efficiency and low emissions of air pollutants such as carbon monoxide (CO) and oxides of nitrogen ($NO_x$).

Conventional domestic gas-fired cooking ranges typically operate with thermal efficiencies of about 45 percent and produce small amounts of CO and $NO_x$. The carbon monoxide is produced because combustion efficiency is incomplete, and oxides of nitrogen are generated in reactions caused mainly by the presence of high temperatures in the burner flame. Although some studies have indicated that there is no evidence that gas cooking is a health hazard, other researchers in the area of indoor air pollution have claimed that levels of CO and $NO_x$ in gas kitchens are of concern.

A gas range which avoids the above-mentioned indoor pollutants is disclosed in U.S. Pat. No. 2,870,829. In that range, burning occurs in an enclosed combustion chamber beneath a plate of heat-resistant glass or ceramic which supports a cooking utensil, and flue products can readily be ducted outside the building without discharging pollutants into the kitchen. Another smooth-top range is described in U.S. Pat. No. 4,020,821; that range may, however, discharge diluted flue products into the kitchen area after collection. Although these smooth-top gas ranges can readily avoid contributing to indoor pollution, their thermal efficiencies may be relatively low. Also, their glass-ceramic tops may be less durable and safe than desired, and the extensive ducting of these ranges may result in packaging problems and high manufacturing costs.

Accordingly, it is an object of the invention to provide a gas-fired cooktop with high thermal efficiency.

It is an object of the invention to provide a gas-fired cooktop which, in addition to operating at high thermal efficiency, discharges $NO_x$ at levels sufficiently low so as not to significantly contribute to indoor pollution.

It is an object of the invention to provide a cooktop for a residential gas range which, in addition to the above objects, is of simple construction, has good thermal shock resistance, and is easy to clean and attractive in appearance.

SUMMARY OF THE INVENTION

The invention is a gas-fired cooktop and a method of cooking which provides high thermal efficiency and low levels of $NO_x$ emissions. According to the invention, an infrared burner radiates infrared energy and also directs combustion products upward towards a perforated, energy-transmissive jet plate. The jet plate transmits most of the radiant infrared energy and also forms jets of combustion products which impinge on the bottom of a cooking utensil supported above the plate. High radiant flux from the surface of the burner rapidly reduces or quenches the gas temperature, inhibiting the formation of $NO_x$, and the combination of high infrared energy transfer through the jet plate and significant convective heat transfer by jet impingement produces high thermal efficiencies.

In a preferred form of the invention the cooktop includes a modulatable power burner formed of a perforated refractory block whose ports form passages for a fuel gas/air mixture and hold a flame front close to the burner surface. The jet plate is made of a glass-ceramic material which transmits about 75 percent of the infrared energy emitted by the burner and directs jets of combustion products against the bottom of a utensil supported on a grate above the plate. Thermal efficiencies of about 70 percent and $NO_x$ emissions of less than about 20 parts per million are achieved by the cooktop.

DESCRIPTION OF PREFERRED EMBODIMENTS

Figure 1:
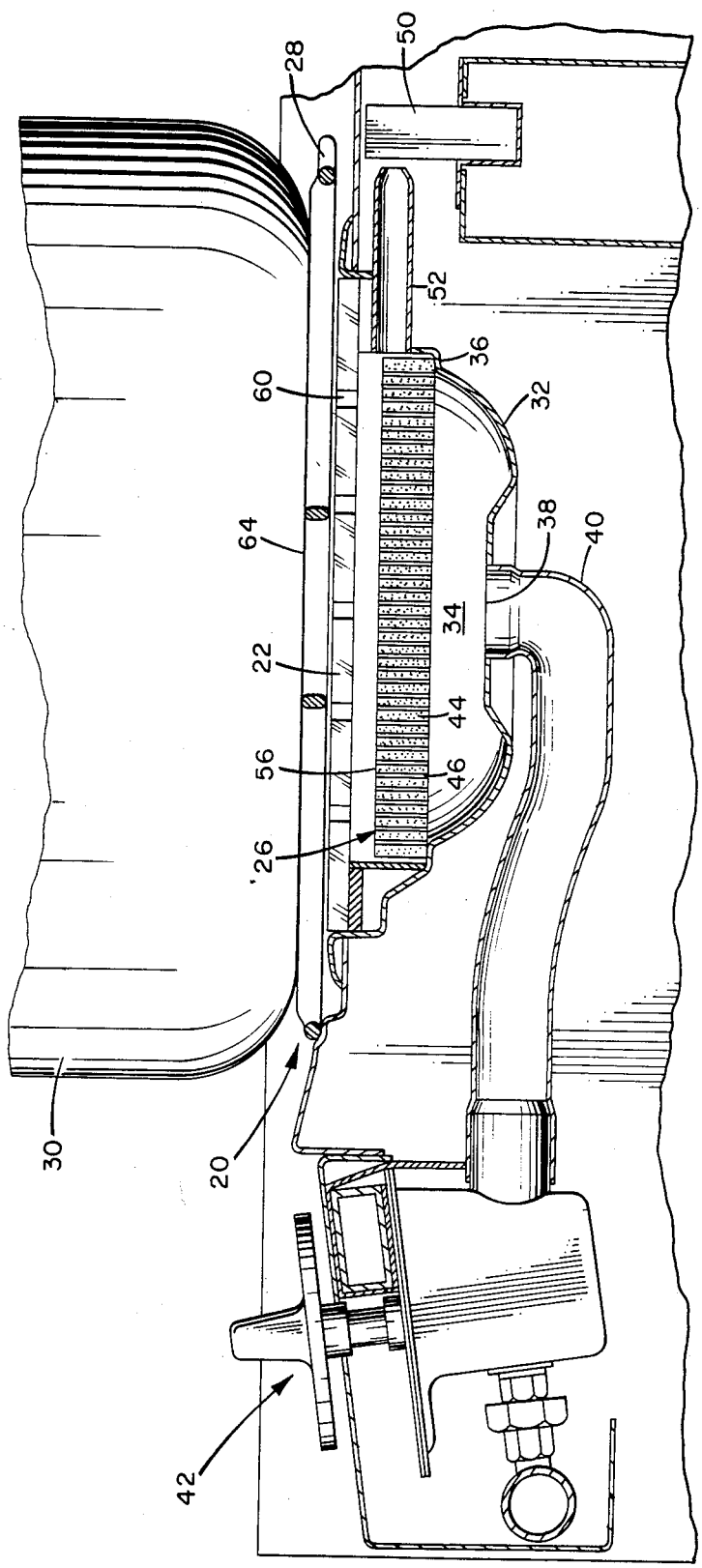
FIG. 1 is a sectional view in side elevation of a preferred cooktop according to the invention.

As illustrated in FIG. 1, a preferred cooktop 20 according to the invention includes a jet plate 22 positioned between an infrared burner 26 and pan supports 28 such as steel grates which support a cooking utensil or pan 30. Infrared burners are a known type in which combustion occurs near a ceramic or metallic surface and which produce a high flux of radiation in the infrared portion of the energy spectrum.

Below the burner 26 is a bowl-shaped structure 32 forming a plenum 34. The structure 32, which may be formed of sheet metal, preferably has a shelf 36 to support the burner 26 and includes an opening 38 in communication with an air/gas feed duct 40. The air/gas feed duct 40 in turn is connected to a mixing valve assembly 42.

The burner 26 is preferably formed of a ceramic tile 44 having a multiplicity of perforations or ports 46 to permit upward flow through the tile 42 of an air/fuel gas mixture. The tile 42 can operate either as a power burner (forced or induced draft) or an atmospheric burner. Powered-mode operation may be preferred because it provides better control of air and gas flow rates; an atmospheric burner, on the other hand, would avoid the cost and space requirements of a blower.

During operation of the cooktop 20, combustion of the air/fuel gas mixture is initiated by means of an igniter 50 such as a glow coil or spark plug positioned at one end of a flash tube 52, the opposite end of the flash tube 52 being mounted adjacent to the top surface 56 of the tile 42. A standing flame is produced on the upper burner surface 56, and the tile ports 46 hold the flame in a thin sheet very close to the surface 56. The tile 42 is heated to incandescence and emits large amounts of radiant infrared energy. High radiant flux from the surface is important not only in directing energy towards the cooking utensil 30 but also in rapidly reducing or quenching the temperature of the combustion gases near the burner surface 56. Such quenching inhibits the formation of nitrogen oxides so that $NO_x$ emissions of the burner 26 are quite low, generally less than about 15-20 ppm.

The perforated jet plate 22 positioned above the burner 26 is a key part of the cooktop 20 and is of considerable importance in the achievement of high thermal efficiencies. In order to provide high convective heat transfer to a cooking utensil 30 supported above the jet plate 22, a plurality of perforations or jet holes 60 are formed in the jet plate 22. During operation of the cooktop 20, the holes 60 form high velocity gas jets from the combustion products received from the burner 26, and the gas jets are directed upward to impinge against and convectively heat the lower surface 64 of the cooking utensil 30. The spent gases then exit through gaps between the pan supports 28 and the jet plate 22 and pass out into the atmosphere above the cooktop 20.

The plate 22, in addition to having holes 60 for producing gas jets, is formed of a material which transmits a large fraction of the infrared energy directed against its lower surface by the burner 26 of the cooktop. A suitable material for the plate 22 is a heat-resistant, transparent/translucent glass-ceramic such as "Pyroceram" code 9618 available from Corning Glass Works of Corning, New York; "Ceran", available from Schott America of Yonkers, New York; and "Neoceram-0 (zero)", available from Nippon Electric Glass Co. Ltd., of Shiga, Japan. A jet plate about 0.2 inches thick formed of such glass-ceramic materials transmits about three-quarters of the infrared energy emitted by the infrared burner 26 of the cooktop. The remainder is absorbed by the plate, causing it to heat up.

Figure 2:
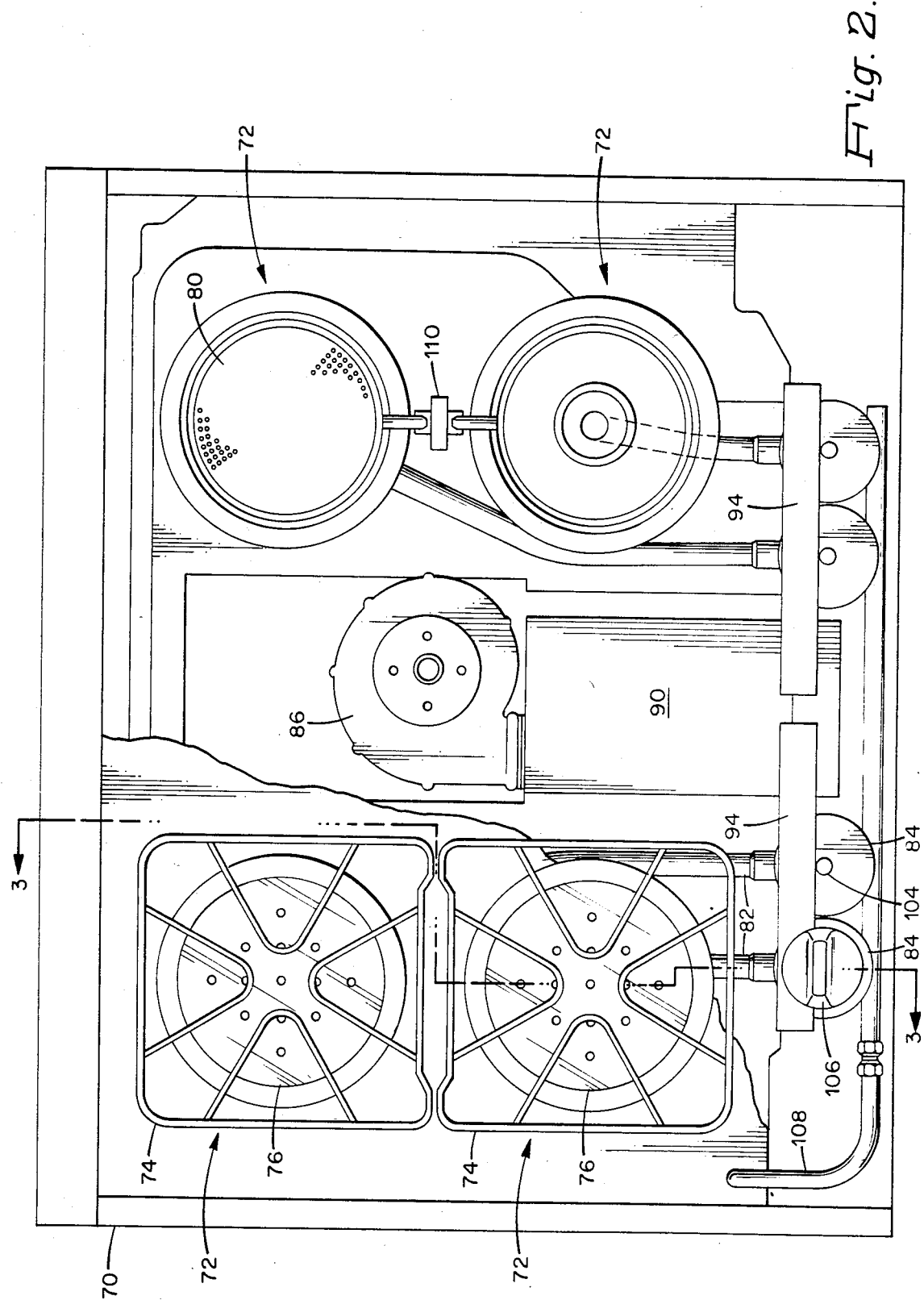
FIG. 2 a plan view, with portions broken away, of a gas range including four cooktops according to a preferred embodiment of the invention.
Figure 3:
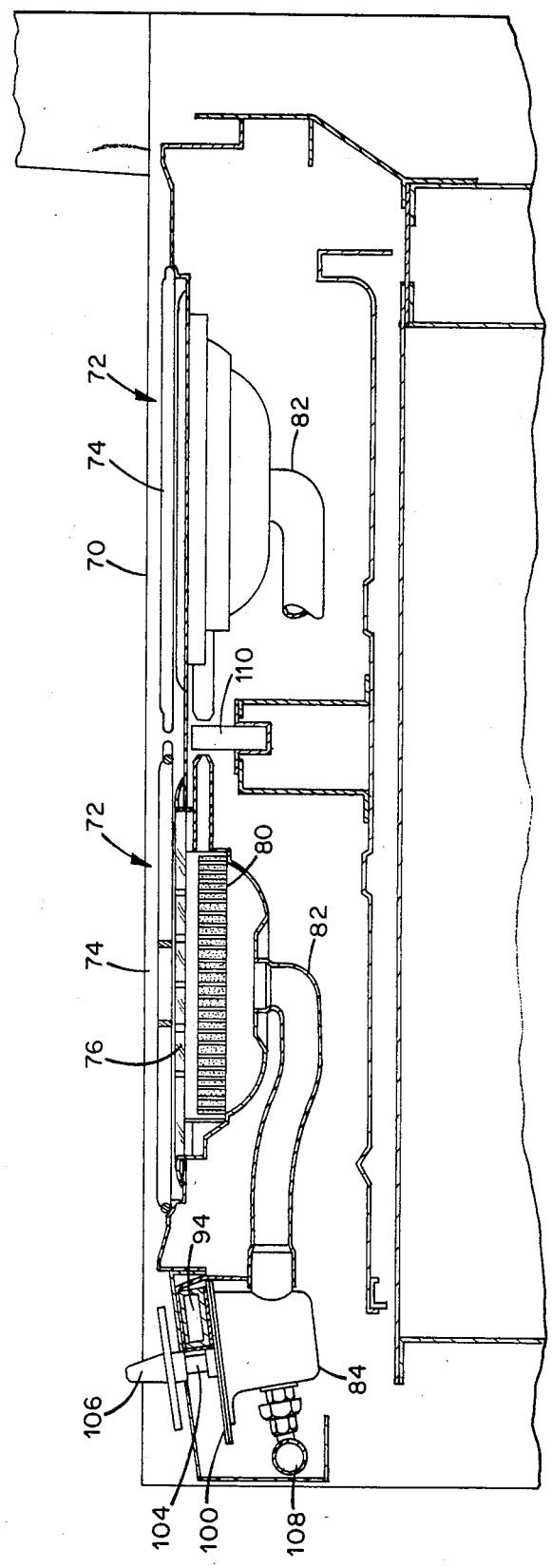
FIG. 3 a vertical section taken along the line 3—3 of FIG. 2.

FIGS. 2 and 3 show top and side cross-sectional views, respectively, of a gas range 70 including four substantially identical cooktops 72 which incorporate the essential features of the invention. In FIG. 2 portions of the range 70 have been broken away to expose certain internal structure, and only the left cooktops are shown, each with its removable grate 74 in position over its jet plate 76. Each cooktop 72 includes a ceramic tile burner 80 connected by an air/gas feed duct such as the duct 82 to one of four mixing valve assemblies. A blower 86 is positioned in the central portion of the range 70 to pressurize an air plenum 90 which in turn is linked to the mixing valve assemblies 84 by two air tubes 94 of rectangular cross-section. Each mixing valve assembly 84 provides a selected stoichoimetry during turndown of its associated burner 80 by mechanically coupling a rotatable air orifice plate 100 to a gas valve shaft 104. Rotation of the gas valve shaft 104 by means of a control knob 106 controls air flow by alignment of one or more of several discrete openings in the air orifice plate 100 with a fixed opening in the bottom of the air tube 94, and at the same time controls fuel gas flow by alignment of one or more of several discrete orifices in the gas valve shaft 104 with a fuel gas supply line 108. Either the orifice plate 100 or the gas valve shaft 104, or both, may instead of discrete openings have a single opening whose area varies continuously upon rotation of the gas valve shaft 104.

As shown in FIGS. 2 and 3, each pair of cooktops 72 on opposite sides of the blower 86 may, if desired, share a single igniter 110. It is also apparent that the blower 86 may be located at the side, or in the rear, of the range 70 and that one or more of the cooktops may be of different sizes.

Figure 4B:
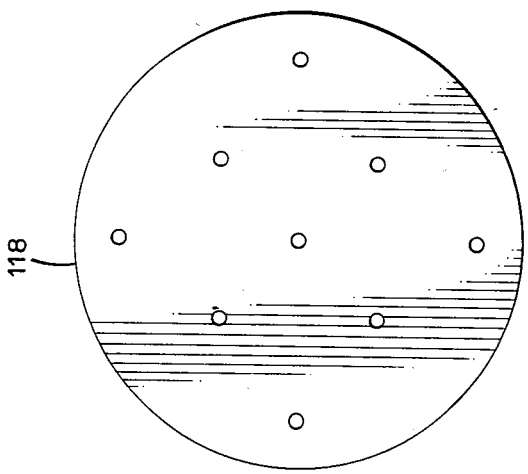
FIG. 4 is a top view of two jet plates having different jet patterns.
Figure 4A:
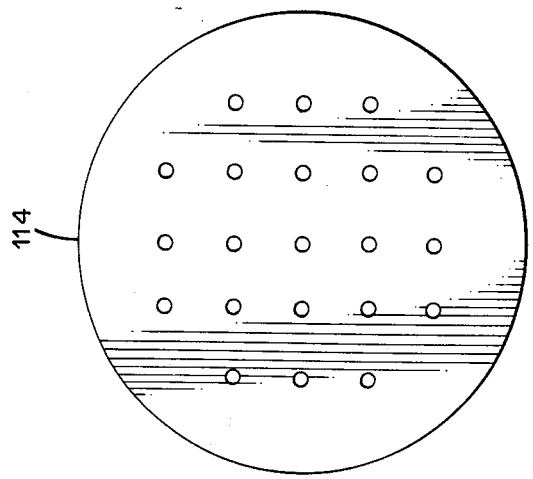

FIG. 4 shows two 5-inch diameter jet plates 114 and 118 with different hole patterns than the 13-holed plates indicated for the cooktops of FIG. 2. Tests have shown that the 21-hole pattern of FIG. 4(a) yields higher cooktop thermal efficiencies than the 9-hole pattern of FIG. 4(b) at all but low burner heating levels. In general, the optimum hole pattern for the jet plates utilized in the cooktop of the invention is considered to be that which minimizes the number of holes while providing acceptably high and uniform heat flux distribution. For example, while a small number of holes may help avoid high fabrication costs and plate failure, it also tends to provide non-uniform convective heat transfer to a cooking vessel. Also of interest is the manner of forming the holes such that crack formation and propagation are minimized. It appears desirable in this regard to drill jet holes in the plate prior to heat-treating the glass-ceramic material to avoid buildup of stresses.

A cooktop of the type illustrated in FIG. 1 was tested with the jet plates shown in FIG. 4 and for two jet plate-to-cooking utensil distances. Design specifications for the cooktop are given in Table 1 and test results are summarized in Table 2. The burner tile of the test cooktops referred to in Table 1 as Hamilton Porcelain Grid No. 1495 was formed of high temperature ceramic refractory (alumina) obtained from Hamilton Porcelains Limited of Brantford, Ontario. Thermal efficiencies set forth in Table 2 were determined in accordance with guidelines set forth in American National Standards Institute publication ANSI Z21.1-1978 by measuring the consumption of gas by the cooktop in heating a specified quantity of water from about 60° F. to 200° F. The tabulated emissions of nitrogen and carbon oxides were measured using emission probes placed above the cooktop burner and/or the jet plate ports, the probes being connected to an infrared analyzer for measurement of CO and $CO_2$ and to a chemiluminescent analyzer (reacting ozone with nitric oxide) for measurement of NO and $NO_2$.

TABLE 1

| COOKTOP DESIGN SPECIFICATIONS | |
|---|---|
| Burner | |
| Hamilton Porcelain Grid No. | 1495 |
| Diameter | 5 in. |
| Surface | Flat |
| Thickness | 0.5 in. |
| Hole Diameter | 0.052 in. |
| No. of Holes | 3205 |
| Percent Open Area | 35 |
| Plenum | |
| Diameter | 5.0 in. |
| Height | 0.75 in. |
| Jet Plate | |
| Lithium Alumino Silicate Glass Ceramic (Pyroceram Brand) | |
| Corning Code | 9618 |
| Color | Transparent (Amber Tint) |
| Effective Diameter | 5 in. |
| Thickness | 0.156 ± 0.031 in. |
| Hole Pattern | A. 21 holes, 7/32 in. dia. |
| | B. 9 holes, ¼ in. dia. |

The air-free (AF) data of Table 2 are very similar to results obtained using recommended ANSI procedures for measuring combustion emissions by obtaining flue gas samples from hood vents and converting the emission levels of such hood samples to an air-free basis by eliminating the dilution effects of air infiltration.

The test data of Table 2 show that thermal efficiency of the cooktop is a function both of hole pattern and jet plate-to-pot distance. Higher efficiencies were attained for the 21-hole pattern jet plate 114 of FIG. 4(a) (Pattern A) than for the 9-hole pattern (B) except at the low heat setting where efficiencies were nearly the same.

The closer (0.25 inch) spacing of jet plate to the cooking pot being heated yielded efficiencies several percent higher than the more distant (0.50 inch) spacing tested, the peak efficiency attained being 71 percent. These proven high efficiencies and the reduced burner input rate permitted by the cooktop of the invention not only lower consumption of gas but also provide a cooler kitchen environment.

Measured emissions for the cooktops tested were low, particularly the levels of $NO_x$ (i.e., $NO+NO_2$) and $NO_2$ which were less than 15 ppm and 5 ppm, respectively.

TABLE 2

COOKTOP TEST RESULTS

| Heat Setting | Jet Plate Hole Pattern | Jet Plate-to-Pot Distance (in.) | Input Rate (Btu/hr) | Thermal Efficiency (%) | $CO_2$ (%) | CO (ppm, AF) | $NO_x$/$NO_2$ (ppm, AF) |
|---|---|---|---|---|---|---|---|
| High | A | 0.5 | 6400 | 60 | 9.6 | 75 | 11/3 |
| | A | 0.25 | 6600 | 65 | 9.4 | 67 | 10/3 |
| | A | 0.25 | 6800 | 71 | 9.1 | 65 | 12/4 |
| | B | 0.5 | 6900 | 55 | 8.7 | 60 | 12/4 |
| | B | 0.25 | 6700 | 57 | 9.2 | 62 | 11/3 |
| Medium | A | 0.5 | 4000 | 60 | 8.5 | 55 | 9/3 |
| | A | 0.25 | 3900 | 64 | 8.3 | 54 | 9/3 |
| | B | 0.5 | 4100 | 55 | 8.7 | 57 | 10/3 |
| | B | 0.25 | 4000 | 59 | 8.4 | 58 | 10/3 |
| Low | A | 0.5 | 2900 | 53 | 8.9 | 52 | 8/2 |
| | A | 0.25 | 2700 | 58 | 9.1 | 57 | 7/2 |
| | B | 0.25 | 2600 | 59 | 9.3 | 54 | 8/2 |

These are far below typical concentrations of about 100 ppm and 30 ppm for other known gas range tops, demonstrating that both low levels of air pollutants and high efficiencies are attainable in the gas-fired cooktop of the invention.

Figure 5:
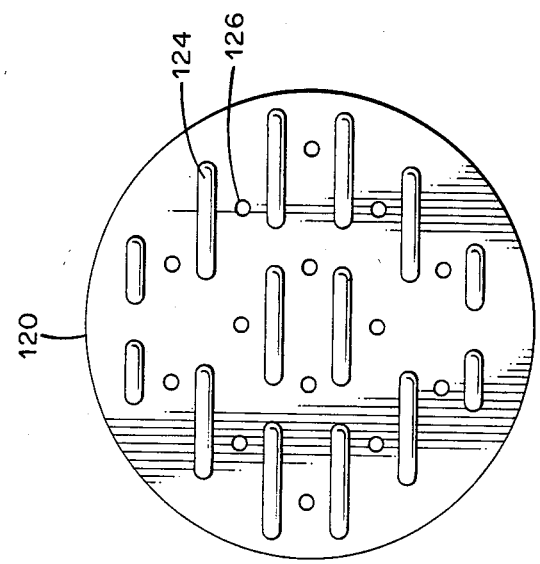
FIG. 5 a top view of a jet plate having integral pan supports according to an alternate embodiment of the invention.

The above-described cooktops are preferred embodiments, and it should be understood that modified designs and changes may be made without departing from the spirit and scope of the invention. For example, although the cooktop illustrated in FIGS. 1–4 has a grate or pan supports which are separate from the perforated jet plate, it is considered well within the scope of the invention to form a jet plate as shown in FIG. 5 having integral supports 124 between jet holes 126. Also, although the preferred burner material is ceramic tile, a metallic screen infrared burner may also be suitable. The invention, therefore, is defined as all embodiments and their equivalents within the scope of the claims which follow.

What is claimed is:

1. A cooktop for a gas range comprising:
an infrared burner having perforations therethrough, said burner operable to produce a flame in a thin sheet on and closely above its top surface and to radiate infrared energy upward from said top surface;
means for supplying a pressurized mixture of fuel gas and air to the bottom of the burner for upward passage through said perforations;
means for igniting said mixture of fuel gas and air adjacent to the upper surface of said burner;
a jet plate spaced above said burner, said jet plate formed of a material transmissive to a large fraction of the infrared energy received from said burner and having a plurality of jet holes therethrough for forming high velocity jets from combustion products received from said burner; and
means for supporting a cooking utensil at a uniform distance above the upper surface of said jet plate, said support means comprising a generally open structure permitting substantial amounts of the infrared radiation transmitted through said jet plate to be transferred to the cooking utensil and also providing unobstructed paths between said jet holes and the bottom of the cooking utensil supported by said structure to permit convective transfer of substantial amounts of heat to the utensil through impingement of said gas jets on the bottom of the utensil.

2. A cooktop as in claim 1 wherein said specified distance between the upper surface of the jet plate and top of said support means is less than about 0.5 inches.

3. A cooktop as in claim 1 wherein said support means comprises a steel grate.

4. A cooktop as in claim 1 wherein said jet plate is formed of a glass-ceramic material.

5. A cooktop as in claim 1 wherein said burner comprises a refractory block having perforations therethrough for the passage of a mixture of fuel gas and air.

6. A cooktop as in claim 1 wherein said means for supplying said mixture of fuel gas and air includes a blower and a mixing valve for controlling the flow rates of gas and air to said burner.

7. A cooktop as in claim 1 wherein the perforations of said burner have a size selected such that during burner operation said perforations hold a flame in a thin sheet close to the burner surface facing said jet plate, whereby said surface becomes incandescent and produces a high flux of radiant infrared energy.

8. A cooktop as in claim 1 wherein said burner includes a metallic screen having perforations therethrough for the passage of a mixture of fuel gas and air.

9. A low $NO_x$, high efficiency cooktop for a gas range comprising:
an infrared burner including a refractory block having perforations therethrough, said block operable to produce a standing flame in a thin sheet close to its upper surface and to radiate infrared energy upward therefrom;
a blower and a mixing valve for supplying a pressurized mixture of fuel gas and air to the bottom of the refractory block for upward passage through said perforations;
means for igniting the pressurized mixture of fuel gas and air adjacent to the upper surface of the block;
a jet plate spaced a specified distance above the refractory block and formed of a glass-ceramic material transmissive to a large fraction of the infrared energy received from said block, said jet plate having a plurality of jet holes therethrough for forming high velocity jets from combustion products received from said refractory block; and
a grate for supporting a cooking utensil a specified distance above the upper surface of said jet plate, said grate shaped to provide unobstructed paths between said jet holes and the bottom of a cooking utensil supported by said grate and also forming gaps permitting exit of the combustion products between said jet plate and said utensil following impingement of said jets on the bottom of the utensil.

10. A method of cooking at high thermal efficiency and low $NO_x$ emissions in a gas-fired range comprising:
combusting a mixture of fuel gas and air in a thin zone close to a surface of an infrared burner;
rapidly reducing the temperature of the combustion products produced in said combustion step by upward flux of radiant infrared energy from said infrared burner, thereby inhibiting formation of $NO_x$; and heating a cooking utensil at high thermal efficiency through simultaneous radiant heat transfer and convective heat transfer by transmitting most of the radiant energy flux from said burner to the utensil and by forming said combustion products into jets and causing the jets to impinge on said utensil said heating step comprises directing said combustion products and radiant energy flux from said burner at a perforated, jet plate transmissive to infrared energy and positioned between said burner and the cooking utensil.

11. A method of cooking as in claim 10 wherein cooking is conducted at a thermal efficiency of at least 65 percent and the $NO_x$ emissions produced are less than 20 parts per million.

12. A cooktop as in claim 1 wherein said support means comprise a steel grate.

* * * * *